United States Patent
Ohmura

[19]

[11] Patent Number: 6,105,301
[45] Date of Patent: Aug. 22, 2000

[54] REEL SEAT FOR A FISHING ROD

[75] Inventor: Ryuichi Ohmura, Shizuoka, Japan

[73] Assignee: Fuji Kogyo Co., Ltd., Shizuoka, Japan

[21] Appl. No.: 09/099,936

[22] Filed: Jun. 19, 1998

[30] Foreign Application Priority Data

Jun. 20, 1997 [JP] Japan ................................... 9-180323

[51] Int. Cl.$^7$ ................................................ A01K 87/06
[52] U.S. Cl. ............................................................ 43/22
[58] Field of Search ....................................... 43/18.1, 22

[56] References Cited

U.S. PATENT DOCUMENTS

| 905,428 | 12/1908 | Heddon | 43/22 |
|---|---|---|---|
| 953,775 | 4/1910 | Becraft | 43/22 |
| 1,883,041 | 10/1932 | Somers | 43/22 |
| 2,076,628 | 4/1937 | Edwards | 43/22 |
| 2,543,881 | 3/1951 | Umphlette et al. | 43/22 |
| 4,045,902 | 9/1977 | Ohmura | 43/22 |
| 4,485,580 | 12/1984 | Ohmura | 43/22 |
| 4,646,460 | 3/1987 | Rumbaugh | 43/22 |
| 5,291,683 | 3/1994 | Yamato | 43/22 |
| 5,347,742 | 9/1994 | Ohmura | 43/22 |
| 5,481,820 | 1/1996 | Ohmura | 43/22 |
| 5,600,915 | 2/1997 | Ohmura | 43/22 |
| 5,904,000 | 5/1999 | Ohmura | 43/22 |

FOREIGN PATENT DOCUMENTS

| 2454560 | 9/1975 | Germany | 43/22 |
|---|---|---|---|
| 7999 | 4/1906 | United Kingdom | 43/22 |

*Primary Examiner*—Michael J. Carone
*Assistant Examiner*—Darren W. Ark
*Attorney, Agent, or Firm*—Evenson, McKeown, Edwards & Lenahan, P.L.L.C.

[57] ABSTRACT

The object of the invention is to solve the problem associated with a fishing rod reel seat in which a nut type movable hood scrapes a surface of a body at a position opposite to a mounting foot of the reel when the nut type movable hood causes the mounting foot of the reel to be pressed, a reel seat is provided with a body 33 having a reel foot seat surface 51, a cylindrical movable hood 37 threadedly fitted around the body 33 and a body protector 43 disposed within the movable hood 37. When the movable hood 37 is advanced under the condition that a mounting foot 73 of the reel 71 is seated on the reel foot seat surface 51, one end portion of the mounting foot 73 is inserted into the movable hood 37, and the one end portion is brought into pressing contact with the reel foot seat surface 51. Before that, the body protector 43 is brought into contact with the body 33 on the opposite side to the real foot seat surface 51.

6 Claims, 5 Drawing Sheets

REEL SEAT FOR A FISHING ROD

BACKGROUND OF THE INVENTION

The present invention relates to a reel seat for a fishing rod. In particular, it relates to a reel seat for a fishing rod, provided with a body having a reel foot seat surface on which a mounting foot of the reel is attachably detachably mounted and a cylindrical movable hood threadedly fitted around the body, an end portion of the mounting foot is relatively inserted on the inside of the movable hood by advancing the movable hood to the mounting foot in the condition that the mounting foot of the reel is seated on the reel foot seat surface and the end portion is pressed on the reel foot seat surface.

In general, a reel seat for a fishing rod is provided with a body having a reel foot seat surface, movable and fixed hoods, a pressure means for pressing the movable hood to a mounting foot of the reel, and the like. The mounting foot is seated on the reel foot seat surface while inserting an end portion of the mounting foot into the fixed hood, and subsequently, the movable hood is advanced to the mounting foot so that the other end of the mounting foot is relatively inserted into the movable hood. The movable hood is pressed by the pressure means.

In many cases of so-called pipe type reel seats, the pressure by the pressure means is of a nut type.

Among the nut type pressure means, a pressure means in which the movable hood itself has a nut function has many advantages in that, for example, parts are fewer in number and the assembling work is simple but on the other hand suffers from a disadvantage in that the mounting foot of the reel is damaged when the movable hood pressingly fastens the mounting foot of the reel.

Therefore, there has been provided such type of a reel seat as having a protector for preventing the mounting foot of the reel from being damaged.

FIG. 7 shows one example of a conventional reel seat provided with a protector (only a rear portion thereof being shown in FIG. 7). In FIG. 7, reference numeral 3 denotes a body of a reel seat 1. The body 3 takes a substantially cylindrical shape. A reel foot seat surface 5 is formed on the body 3 by cutting a part of an outer circumferential portion in a flat manner, and at the same time, a male thread 7 is formed on the outer circumferential surface of the rear end portion. Reference numeral 9 denotes a hood which is formed into a cylindrical shape and is provided with a female thread 11 in an intermediate portion in the axial direction of the inner circumferential surface. Then, the movable hood 9 is fitted around the body 3 with the male thread 7 and the female thread 11 being engaged with each other. Accordingly, when the movable hood 9 is rotated, it is moved in the axial direction.

A relatively thin space 13 is formed between the reel foot seat surface 5 of the body 3 and the inner circumferential surface of the movable hood 9.

Reference numeral 15 denotes a protector which is a small strip bent in an arcuate manner and is assembled into the above-described space 13 where it is housed. The inner surface 17 of the protector facing the reel foot seat surface 5 is formed into a conical slant surface so that its diameter is increased forwardly. Since the circumferential portion of the protector 15 is seated on the reel foot seat surface 5, the protector is kept from rotating relative to the body 3 but may slip relative to the movable hood 9. A space 19 defined by the protector 15 and the reel foot seat surface 5 is a reel foot insertion recess on the rear side.

Incidentally, although not shown, a cylindrical fixed hood is mounted on the front end portion of the body 3.

Then, the mounting foot 21 is seated on the reel foot seat surface 5 while inserting one end portion of the mounting foot of the reel into the interior of the fixed hood (not shown). Subsequently, when the movable hood 9 is rotated in the screw-in direction, the movable hood 9 is advanced while slipping on and along the protector 15. As a result, the other end portion of the mounting foot 21 is relatively inserted into the reel foot insertion recess 19. The inner surface 17 of the protector 15 is pressed against the reel foot seat surface 5 while sandwiching the mounting foot 21.

However, since the movable hood 9 never contacts directly with the mounting foot 21, there is no fear that the mounting foot 21 is damaged by the fastening action of the movable hood 9.

However, such a reel seat 1 for a fishing rod suffers from a problem that, when the movable hood 9 is brought into pressing contact with the mounting foot 21, the movable hood 9 scrapes the surface of the body 3. Namely, when the movable hood 9 causes the mounting foot 21 to pressingly contact with the reel foot seat surface 5, the portion, opposite the protector 15, of the movable hood 9 is pulled toward the body 3 by the reactive force. In this case, since an inner diameter of the movable hood 9 is slightly greater than a maximum diameter of the body 3, i.e., an outer diameter of the portion other than the reel foot seat surface 5, there is a fear that the above-described portion scratches the body 3 to form a spiral scratch.

In particular, in the case where the body 3 is formed of natural wood, the damage formed on the body 3 would remarkably degrade the aesthetic appearance.

In order to solve the damage problem, it is possible to increase the inner diameter of the movable hood 9. However, in this case, a diameter of the real seat 1 increases so that the weight of the reel seat increases and a separate problem is caused for a fisherman who will find it difficult to grip it.

In view of the foregoing defects inherent in the prior art, an object of the present invention is to provide a reel seat for a fishing rod in which there is no fear that a movable hood damages a body without increasing the diameter of a movable hood.

SUMMARY OF THE INVENTION

In order to attain this and other objects, in a reel seat for a fishing rod according to the present invention, a body protector which comes into contact with a portion, opposite to the reel foot seat surface, of an outer circumferential surface of a body is arranged inside the movable hood so as to slip relative to the movable hood, and said body protector comes into contact with the body when the one end portion of the mounting foot of the reel starts to come into pressing contact with the reel foot seat surface at the latest.

Accordingly, when the movable hood causes the mounting foot of the reel to come into pressure contact, the body protector is brought into contact with the body on the opposite side to the reel foot seat surface, there is no fear that the movable hood is brought into direct contact with the body.

BRIEF DESCRIPTION OF THE DRAWINGS

In the accompanying drawings:

FIG. 6 is a transverse cross-sectional view showing a fly seat into which the protector shown in FIG. 5 is built in.

DESCRIPTION OF THE PREFERRED EMBODIMENTS

Figure 1:
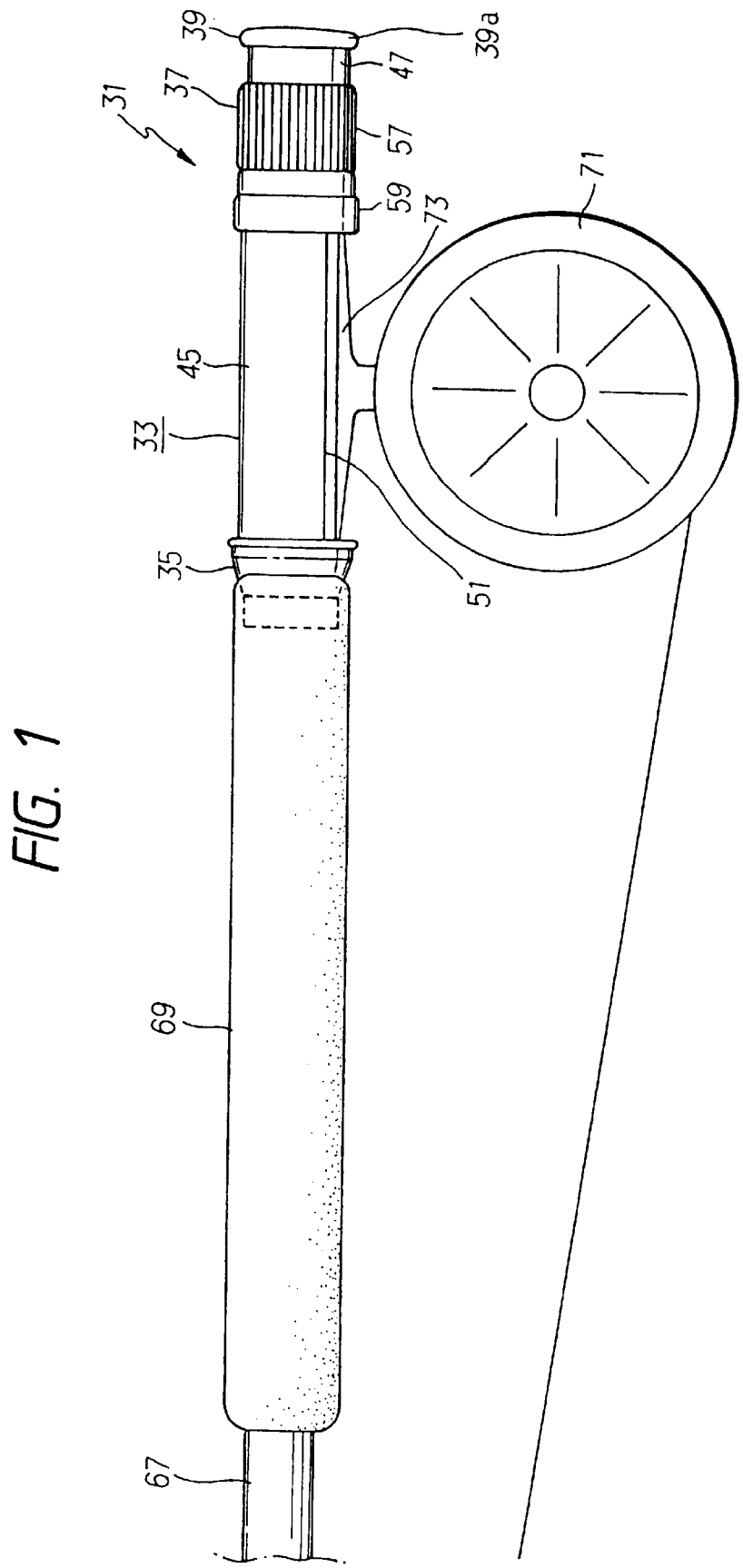
FIG. 1 is a side elevational view showing the important part of a fishing rod provided with a fly seat in accordance with an embodiment of the invention.

A reel seat for a fishing rod according to an embodiment of the present invention will now be described in detail with reference to the accompanying drawings. In the embodiment shown in the drawings, the present invention is applied to a fly reel seat 31 used a fly fishing rod.

The fly reel seat 31 is composed of a body 33 which formes a base portion, two front and rear hoods 35 and 37 mounted on the body 33 (a direction toward left hand in FIG. 1 will be referred to as a front side, and a direction toward right hand in FIG. 1 will be referred to as a rear side), a cap 39, and two protectors 41 and 43 and the like.

The body 33 is formed by integrally coupling three members of a main body 45, a sub-body 47 and a screw portion 49. The main body 45 and the sub-body 47 are made of a natural wood reinforced by impregnation with synthetic resin, and the screw portion 49 is made of synthetic resin such as nylon or the like.

Figure 2:
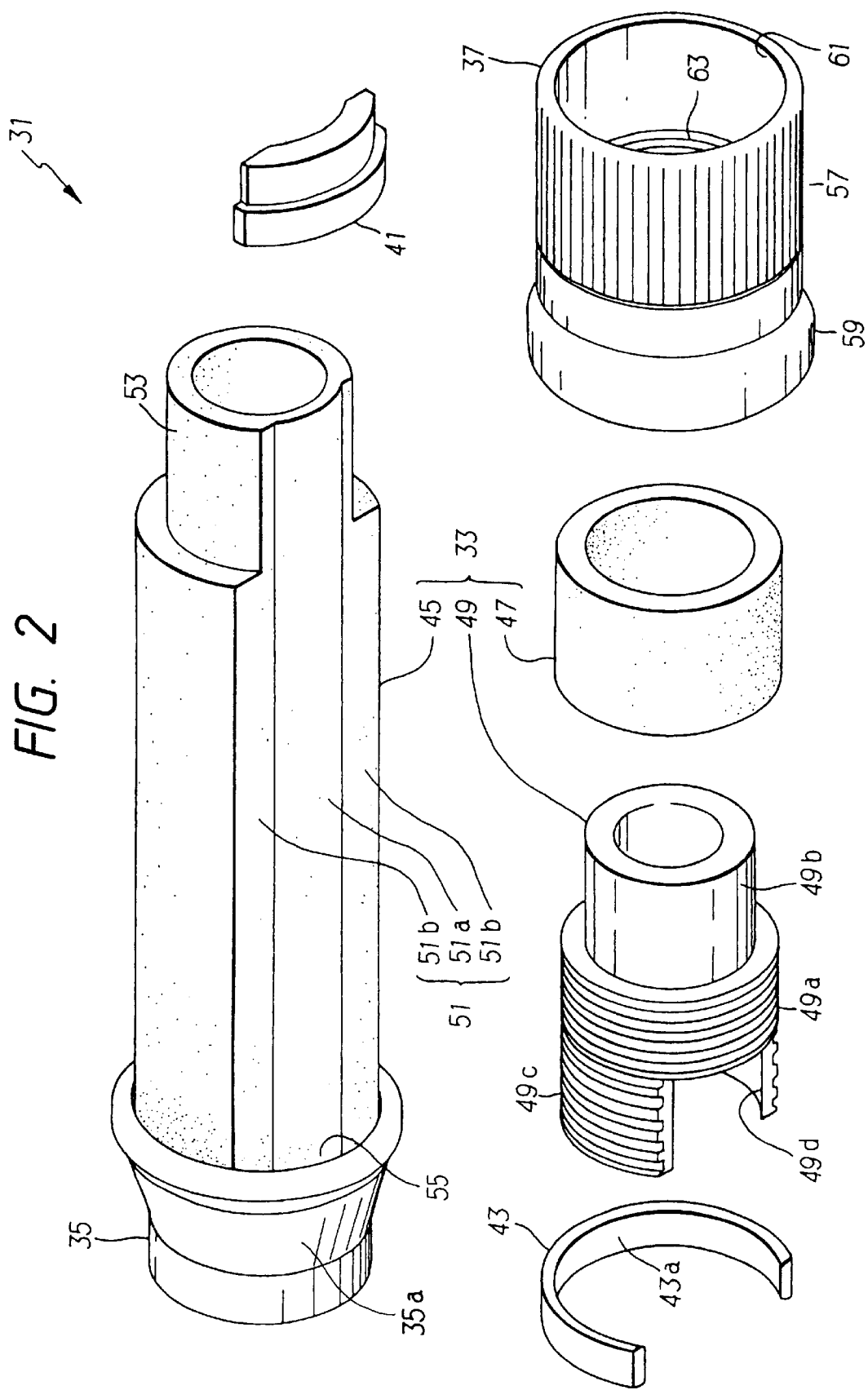
FIG. 2 is an enlarged exploded perspective view showing the fly seat shown in FIG. 1.

As is apparent from FIG. 2, the shape of the main body 45 is substantially in the form of a relatively long cylinder. A reel foot seat surface 51 is formed on the outer circumferential portion by removing a part thereof in the circumferential direction. As viewed in the axial direction of the body 45, the reel foot seat surface 51 is formed of an intermediate portion 51a having an arcuate shape projecting downwardly and horizontal side portions 51b located on both sides of the intermediate portion 51a. An overall width thereof takes a center angle of about 110° of the axis of the main body 45.

A rear end of the main body 45 is formed into a joint portion 53 having a diameter slightly smaller than a diameter of the other portion. The above-described reel foot seat surface 51 is provided along the full length of the main body 45 including this joint portion 53.

The sub-body 47 is formed into a cylindrical shape having a short axis relative to a maximum diameter of the main body 45. Its outer diameter is substantially the same as the maximum diameter of the main body 45.

The screw portion 49 is formed into a cylindrical shape composed of a larger front portion 49a and a rear portion 49b having a slightly smaller diameter than that of the front portion 49a. A male thread 49c is formed on the outer circumferential surface of the front portion 49a.

A cutaway portion 49d is formed in a substantially semicircular portion of a circumferential wall of the front portion 49a. A width of the cutaway portion 49d in the circumferential direction is equal to a right-and-left width of the reel foot seat surface 51 in the joint portion 53 of the main body 45.

The joint portion 53 of the main body 45 is inserted into the front portion 49a of the screw portion 49 and adhered thereto. Upon the coupling, the screw portion 49 and the cutaway portion 49d are aligned with each other so that a plane located on both sides of the cutaway portion 49d of the screw portion 49 is made flush with the plane of the side portions 51b of the reel foot seat surface 51. Also, the rear portion 49b of the screw portion 49 is inserted into the sub-body 47 and adhered thereto. Thus, the main body 45, the screw portion 49 and the sub-body 47 are coupled with each other in a one-piece manner to form the body 33.

The two hoods 35 and 37 are used to separately hold both front and rear end portions of the mounting foot of the reel. The front hood 35 serves as a fixed hood and the rear hood 37 serves as a movable hood. These hoods 35 and 37 are formed of light metal such as titanium, aluminum or the like.

A rear portion 35a of the fixed hood 35 is tapered so that it expands rearwardly and is fixed around the front end portion of the main body 45. A protector (not shown) is mounted on an inner surface of the rear portion 35a in a receptive manner. A front side reel foot insertion recess 55 (see FIG. 2) is formed by the protector (not shown) and the rear end portion of the reel foot seat surface 51.

The movable hood 37 as a whole takes a cylindrical shape. The movable hood 37 has substantially the same length in the axial direction as the length of the screw portion 49. A knurl is formed on the outer circumferential surface of the rear portion 57.

An inner diameter of a front portion 59 of the movable hood 37 is greater than that of a rear portion 57 and a stepped portion 61a (see FIG. 3) facing forwardly is formed substantially in an intermediate portion of the inner circumferential surface 61 of the movable hood 37 in the axial direction. The inner diameter of the front portion 59 is much slightly greater than the maximum diameter of the main body 45.

A protector arrangement groove 61b extending in an endless manner in the circumferential direction and having a relatively short length is formed at a position on the front side of the inner circumferential surface 61 of the movable hood 37. Also, a female thread 63 is formed in a region extending to some extent rearwardly from the above-described stepped surface 61a of the inner circumferential surface 61.

Such a movable hood 37 is fitted around a rear end portion of the body 33. The female thread 63 of the movable hood 37 is engaged with the male thread 49c of the screw portion 49 so that the movable hood 37 is mounted on the body 33 with a nut type moving function.

The cap 39 is composed of a substantially disc-like main portion 39a and an insertion portion 39b projecting forwardly from a central portion of the main portion 39a and is made of metal such as titanium. The insertion portion 39b of the cap 39 is pressingly fitted from the rear side into a hole of the above-described screw portion 49 so that the cap 39 is mounted on the rear end of the body 33.

Figure 3:
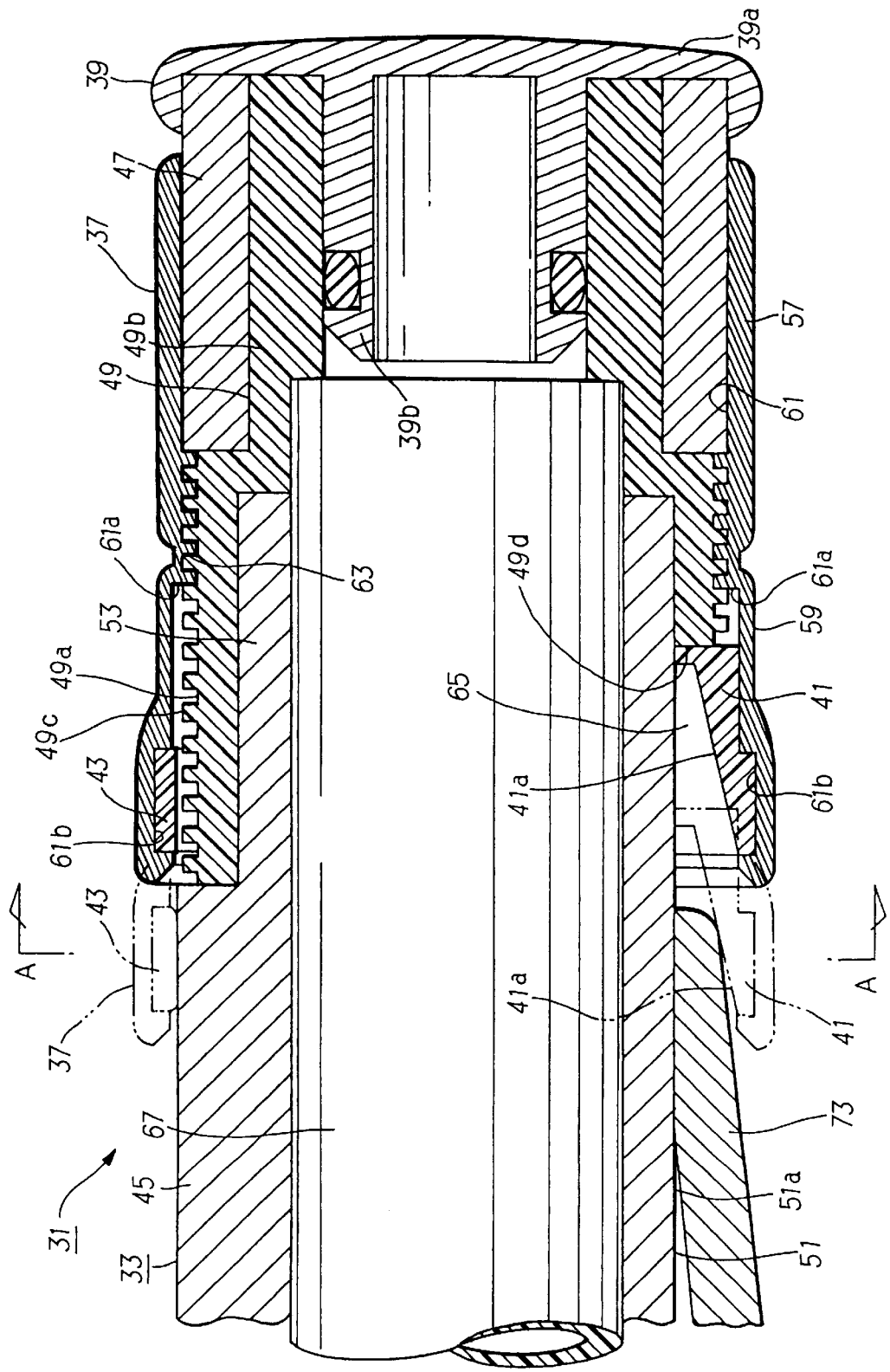
FIG. 3 is an enlarged longitudinal sectional view showing an important part of the fly seat shown in FIG. 1.
Figure 4:
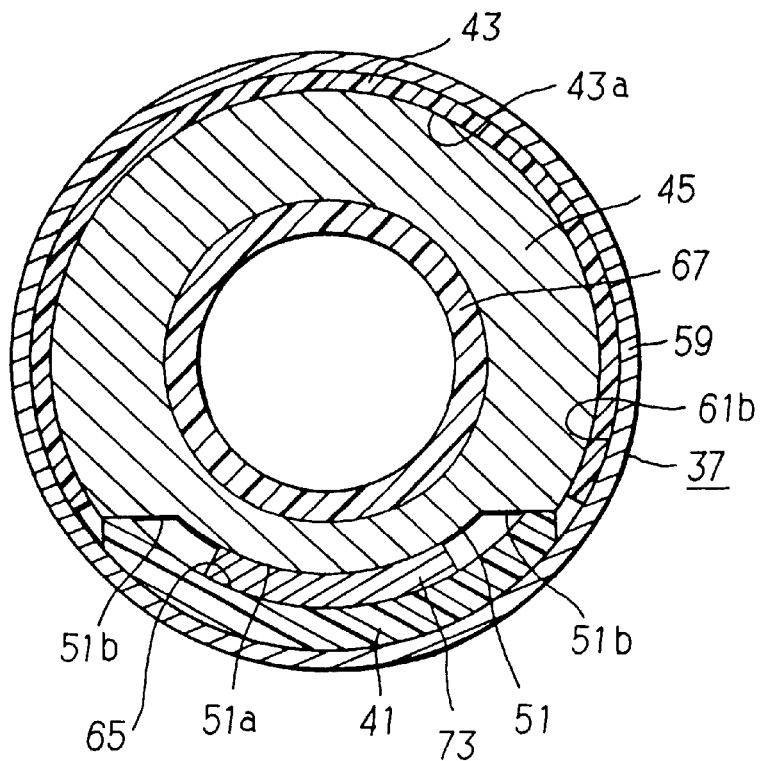
FIG. 4 is a cross-sectional view taken along the line A—A of FIG. 3.

A movement of the movable hood 37 is performed between the maximum rearward limit position indicated by a thick bold line in FIG. 3 and the maximum forward limit position at which the stepped surface 61a is brought in contact with the stepped surface of the main body 45, i.e., the stepped surface which is the border between the joint portion 53 and the rest of the main body 45.

One of the two protectors 41 and 43, protector 41, is a reel foot protector for protecting the mounting foot of the reel, and the other protector 43 is a protector for protecting the body 33. These protectors 41 and 43 are formed of synthetic resin having a high slippage property such as duracon or the like.

The reel foot protector 41 takes a substantially crescent shape projection downwardly as viewed in the axial direction. The inner circumferential surface 41a thereof is formed into a conical slant surface which has a larger diameter forwardly. The stepped portion is formed in an intermediate portion in the axial direction of the outer circumferential surface thereof.

Such a reel foot protector 41 is assembled into the interior of the front end portion of the movable hood 37 so that the front portion of the outer circumferential portion thereof is received in the above-described protector arrangement groove 61b under the condition both arcuate end portions are in contact with the side portions 51b of the reel foot seat surface 51. This assembling work is performed from the front opening portion of the movable hood 37 by utilizing the elasticity of the reel foot protector 41.

Thus, the reel foot protector 41 is kept unrotatable relative to the body 33 but may slip relative to the movable hood 37.

Then, the rear reel foot insertion recess 65 is formed by the inner circumferential surface 41a of the reel foot protector 41 and the reel foot seat surface 51.

The body protector 43 has an annular shape whose part is removed and which has a circumferential length of two thirds of the full circumference, and a width which is substantially the same as-a front-and-rear width of the protector arrangement groove 61b.

Such a body protector 43 is received in a position that does not interfere with the reel foot protector 41 out of the protector arrangement groove 61b and hence is assembled into the interior of the front end portion of the movable hood 37. This assembling work is performed before the movable hood 37 is mounted on the body 33.

Thus, the body protector 43 is kept unrotatable relative to the body 33 but may slip relative to the movable hood 37. Then, a thickness of the body protector 43 is somewhat larger than a depth of the protector arrangement groove 61b. Accordingly, the inner circumferential surface 43a of the body protector 43 projects from the inner circumferential surface 61 of the movable hood 37.

The fly seat 31 is thus constructed. A blank 67 is inserted into a hole of the body 33. The blank 67 is inserted into the hole of the body 33 so that the fly seat 31 is mounted on the rear end portion of the blank 67.

Reference numeral 69 denotes a grip fitted around the blank 67. The front portion of the fixed hood 35 is covered by the grip 69.

The mounting operation of the reel 71 to the fly seat 31 will be performed as follows.

First of all, the movable hood 37 is moved rearwardly to some extent to open the space between the fixed hood 35 and the movable hood 37. One end portion of the mounting foot 73 of the reel 71 is inserted into the front reel foot insertion recess 55 so that the mounting foot 73 is seated on the reel foot seat surface 51. Under this condition, the movable hood 37 is rotated in the screw-in direction. Then, the movable hood 37 is moved forwardly relative to the reel foot protector 41 and the body protector 43 so that the other end portion of the mounting foot 73 is inserted relatively into the reel foot insertion recess 65 on the rear side. The inner circumferential surface 41a of the reel foot protector 41 is brought into contact with the portion in the vicinity of the other end of the mounting foot 73 as indicated by two-dot-and-dash lines in FIG. 3. Then, under this condition, the movable hood 37 is rotated so that both front and rear end portions of the mounting foot 73 are firmly inserted into the front and rear reel foot insertion recesses 55 and 65, respectively, and the mounting foot 73 is in pressing contact with the reel foot seat surface 51.

When the movable hood 37 causes the mounting foot 73 to come into pressing contact with the reel foot seat surface 51, the portion, located opposite to the reel seat surface 51 at this moment, of the front end portion of the movable hood 37 is pulled toward the body 33 by the reactive force of the pressing contact but, since the body protector 43 is interposed between the portion and the-body 33, the body protector 43 is only in contact with the body 33 as indicated two-dot-and-dash lines in FIG. 3. There is no fear that the movable hood 37 is brought into contact with the body 33. Then, since the body protector 43 is kept unrotatable, the body protector 43 is only in contact with the body 33. There is no fear that the body protector 43 would scrape the body 33.

Incidentally, the timing of when the body protector 43 comes into contact with the outer circumferential surface of the body 33 subtlely differs according to the direction of the fly seat 31 (differences in direction such as upward, downward or the like) or the size of the mounting foot 73 or the like. However, at the latest when the reel foot protector 41 starts to press the mounting foot 73, the body protector 43 is brought into contact with the body 33.

It is possible to form the reel foot protector 41 and the body protector 43 into a one-piece manner with each other. An example of such a composite type protector is shown in FIGS. 5 and 6.

Figure 5:
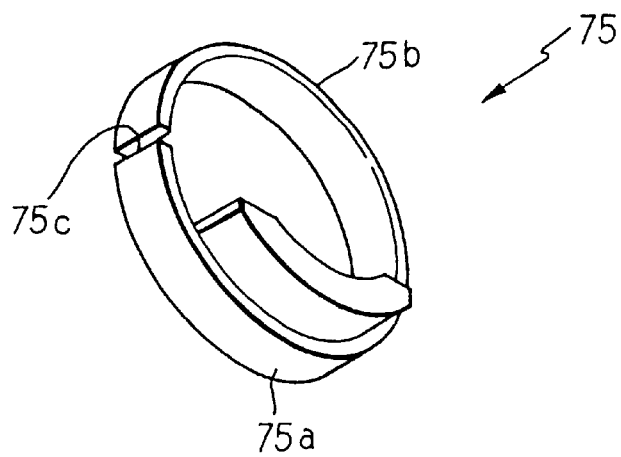
FIG. 5 is a perspective view showing another embodiment of a protector.
Figure 6:
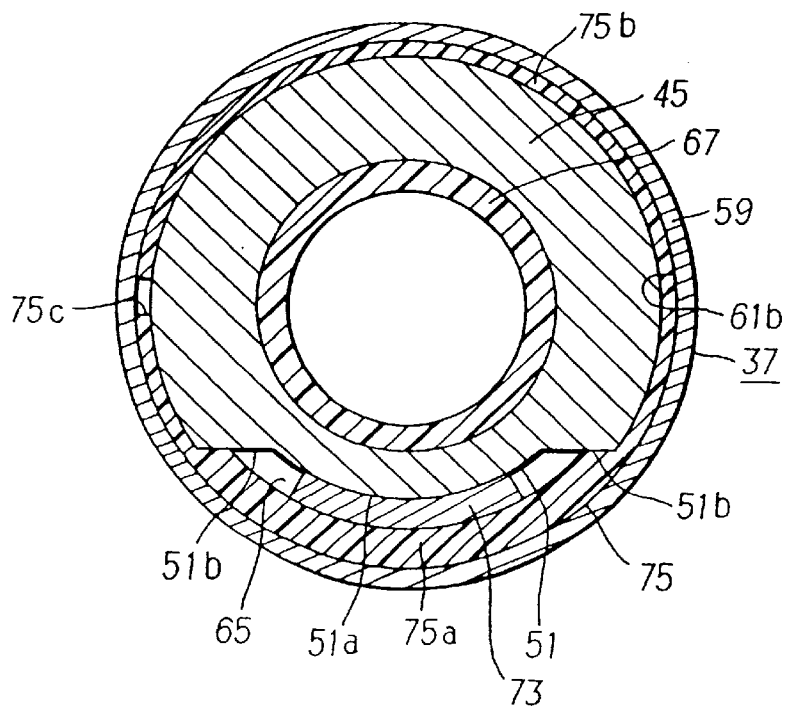
Figure 7:
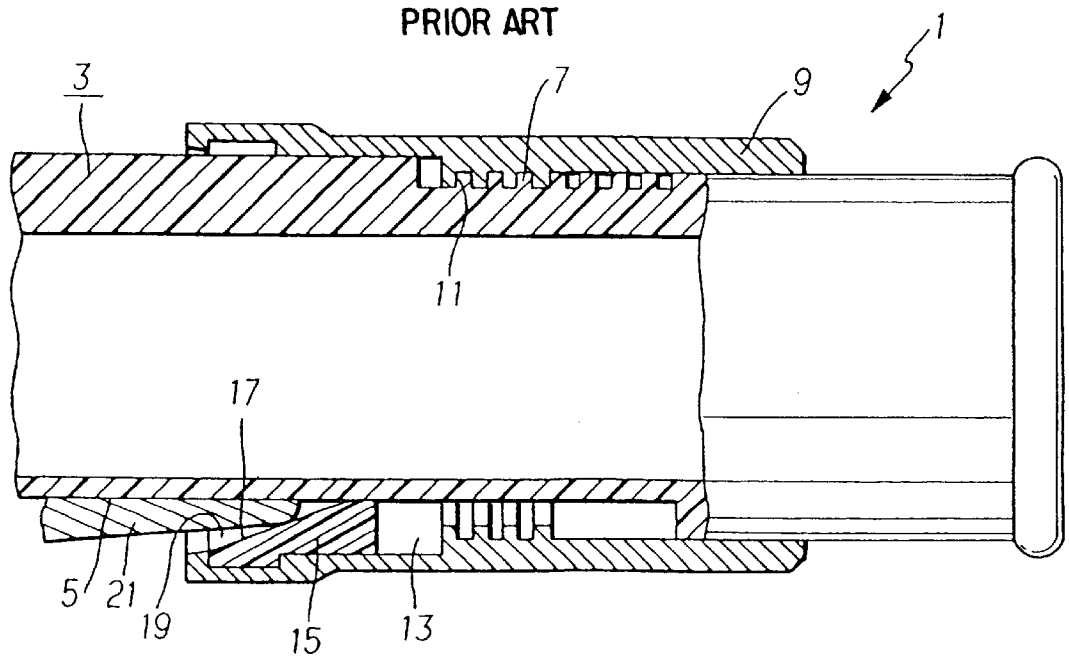
FIG. 7 is a partially fragmentary side elevational view showing the important part of an example of a conventional reel seat for a fishing rod.

In the protector shown in FIGS. 5 and 6, the reel foot protector portion 75a and the body protector portion 75b are made of synthetic resin such as duracon or the like and formed into a one-piece member. The reel foot protector portion 75a is formed into substantially the same shape as that of the reel foot protector 41. Also, although the mid-portion of the body protector portion 75b is cut at a slit 75c, the body protector 75b is formed to define substantially an annular ring in cooperation with the front portion of the reel foot protector portion 75a.

As shown in FIG. 6, the protector 75 is received in the protector arrangement groove 61b provided in the movable hood 37. Both right and left end portions of the reel foot protector portion 75a are seated on the reel foot seat surface 51 so that the reel foot protector portion 75a is kept from rotating relative to the body 33 but may slip relative to the movable hood 37. Accordingly, the reel foot protector portion 75a serves to prevent the mounting foot 73 of the reel 71 from being damaged and the body protector portion 75b serves to prevent the body 33 from being damaged.

If the protector is formed in such a composite manner, it is possible to decrease the number of the parts and the number of the assembling steps.

Incidentally, in this protector 75, in order to facilitate the assembling work into the movable hood 37, the slit 75c is provided. However, depending upon the flexibility of the material to be used, it is possible to dispense with the slit.

Various details of the invention may be changed without departing from its spirit or its scope. Furthermore, the foregoing description of the embodiments according to the present invention is provided for the purpose of illustration only, and not for the purpose of limiting the invention as defined by the appended claims and their equivalents.

For example, the material of the body is not limited to the natural wood, and the movable hood is not necessarily located on the rear side.

Also, in the embodiment, the movable hood has the integral screw groove for the nut function but the movable hood according to the present invention may have discrete hood and nut members.

Then, in the embodiment, the invention is applied to a fly seat but the invention is not limited thereto or thereby. The present invention may be widely applied to various reel seats for a fishing reel.

As described above, in the reel seat for a fishing rod according to the present invention, when the movable hood causes the mounting foot of the reel to come into contact with the reel foot seat surface, the body protector is brought into contact with the reel foot seat surface on the opposite side. Accordingly, there is no fear that the movable hood would come into direct contact with the body.

Accordingly, in accordance with the present invention, even if the diameter of the movable hood is not increased, it is possible to prevent the movable hood from damaging the body without fail.

What is claimed is:

1. A reel seat for a fishing rod which comprises a generally cylindrical body having a thread formed on an outer circumferential surface thereof and a reel foot seat surface; a cylindrical movable hood rotatably fitted around said body and having a thread formed on an inner circumferential surface thereof to cooperate with said thread formed on said outer circumferential surface of the body; said cylindrical movable hood and said body defining a space; and a body protector arranged in said space such that it can slip in a circumferential direction relative to the movable hood, said body protector coming into contact with a portion of said outer circumferential surface of the body diametrically opposite the reel foot seat surface; whereby when a reel mounting foot is seated on the reel foot seat surface and one end portion of the reel mounting foot is brought into pressing contact with the reel foot seat surface, said one end portion of the mounting foot is inserted into said space by rotatably moving the movable hood forwardly to the mounting foot and said body protector comes into contact with the body at the latest when the one end portion of the mounting foot starts to come into pressing contact with the reel foot seat surface.

2. A reel seat for a fishing rod as defined in claim 1, wherein said body protector is not rotatable relative to said body.

3. A reel seat for a fishing rod as defined in claim 1, further comprising a reel foot mounting space defined by said cylindrical movable hood and said body and a reel foot protector disposed in said reel foot mounting space.

4. A reel seat for a fishing rod as defined in claim 3, wherein said body protector and said reel foot protector are integral.

5. A reel seat for a fishing rod as defined in claim 4, wherein said body protector and said reel foot protector are unitary.

6. A reel seat for a fishing rod as defined in claim 1, wherein said reel foot seat surface comprises an arcuate portion extending longitudinally and a pair of generally planar portions located on either side of said arcuate portion.

* * * * *